United States Patent [19]

Murata et al.

[11] Patent Number: 5,337,083
[45] Date of Patent: Aug. 9, 1994

[54] DIGITAL VIDEO CAMERA SUPPRESSING LOW-SATURATION CHROMINANCE

[75] Inventors: Haruhiko Murata, Moriguchi; Yukio Mori, Yawata; Akihiro Maenaka, Moriguchi; Masao Takuma, Toyonaka; Kiyotada Kawakami, Osaka; Tooru Yamamoto, Daito; Tooru Asaeda, Ikoma, all of Japan

[73] Assignee: Sanyo Electric Co., Ltd, Moriguchi, Japan

[21] Appl. No.: 45,738

[22] Filed: Apr. 14, 1993

[30] Foreign Application Priority Data

Apr. 16, 1992 [JP] Japan .................. 4-096224

[51] Int. Cl.⁵ ............................... H04N 9/68
[52] U.S. Cl. .................. 348/256; 348/646; 348/242
[58] Field of Search .............. 358/36, 37, 28, 41; 348/256, 646, 242; H04N 9/68

[56] References Cited

U.S. PATENT DOCUMENTS

| 4,712,132 | 12/1987 | Soca | 358/37 |
| 4,953,011 | 8/1990 | Mori et al. | 358/37 |
| 5,124,786 | 6/1992 | Nikoh | 358/36 X |

Primary Examiner—Mark R. Powell
Attorney, Agent, or Firm—Armstrong, Westerman, Hattori, McLeland & Naughton

[57] ABSTRACT

A digital video camera includes a pseudo-saturation calculating circuit by which a pseudo-saturation corresponding to an actual saturation is calculated on the basis of two color difference signals, and a suppression coefficient is calculated by a suppression coefficient calculating circuit on the basis of the pseudo-saturation. Each of the color difference signals are outputted by a selecting circuit in a dot sequential manner, and multiplied by the suppression coefficient in a multiplying circuit. Therefore, a signal in which a low-saturation chrominance signal is outputted from the multiplying circuit, whereby the low-saturation chrominance signal can be suppressed even though a sampling frequency is not increased.

5 Claims, 7 Drawing Sheets

F I G. 1
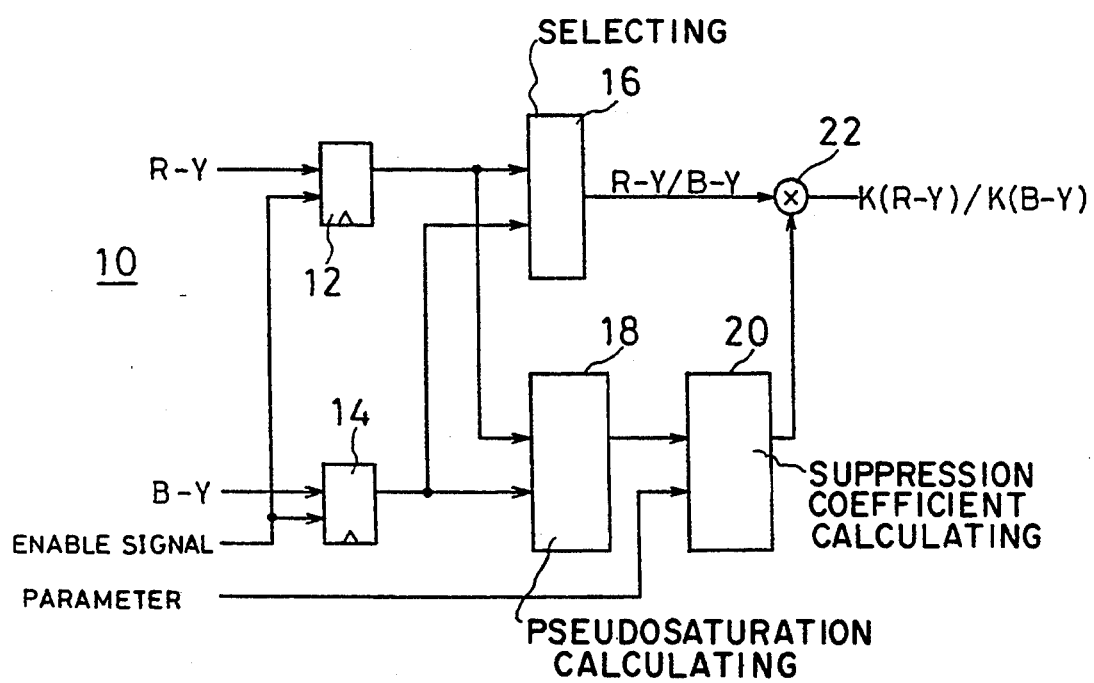
F I G. 2
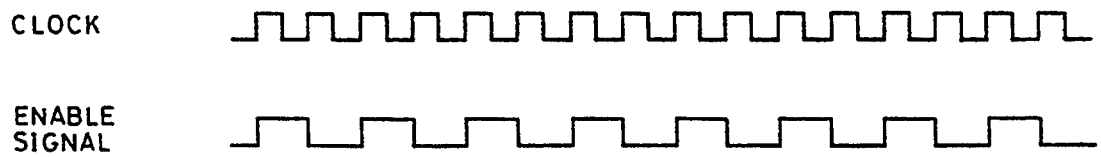

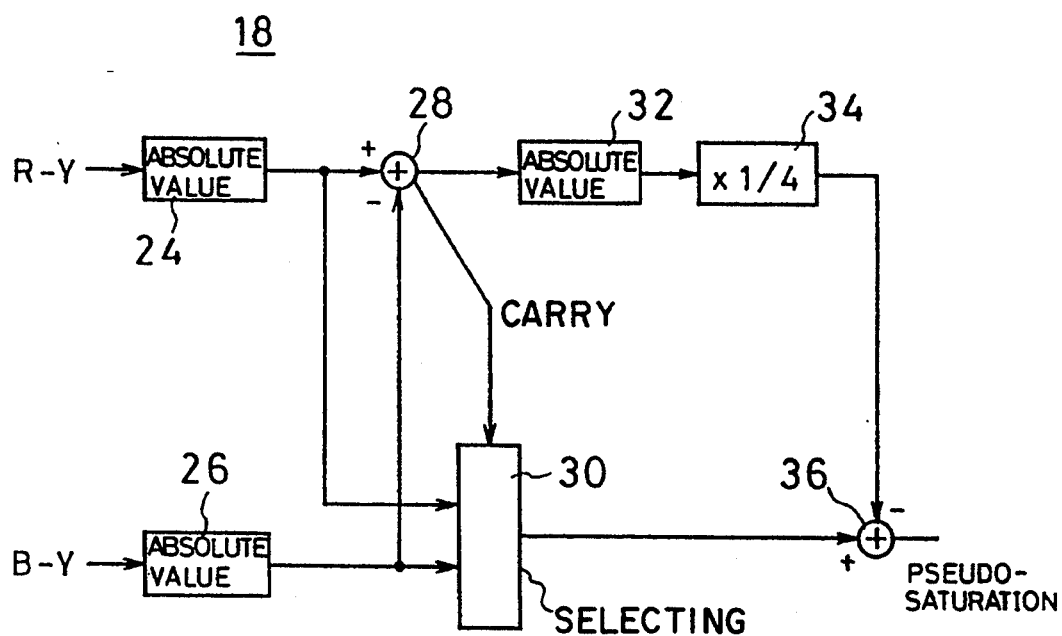
F I G. 3

DIGITAL VIDEO CAMERA SUPPRESSING LOW-SATURATION CHROMINANCE

BACKGROUND OF THE INVENTION

1. Field of the Invention

The present invention generally relates to a digital video camera. More specifically, the present invention relates to a digital video camera in which an output from a CCD, for example, is converted into a digital signal so as to be processed in a digital manner.

2. Description of the Prior Art

Due to unevenness of a color filter of the CCD, there is an occasion that a subject is slightly colored with irregularity even when the subject is white. This can be solved by suppressing a low-saturation portion of a chrominance signal (modulated color signal). In a conventional analog camera signal processing circuit, a chrominance signal is subjected to a coring process, that is, a gain of the chrominance signal in the vicinity of zero is made small, and then the signal is filtered by a low-pass filter, whereby a low-saturation chrominance signal is suppressed.

In a signal processing for a video camera, a digital processing has an advantage over an analog processing for automating adjustment process, reduction of the number of parts, and etc. For handling a camera signal in a digital manner, the low-saturation chrominance suppression is, of course, to be performed in a digital signal processing. However, since a digital low-pass filter handles discreet values for processing the camera signal, if a signal processing similar to that of the analog processing is performed in the digital processing, a peak position of a signal after the digital low-pass filter becomes different from a peak position of a signal before the digital low-pass filter. That is, phases of the signals before and after the digital low-pass filter becomes different from each other, and resultingly, deviation occurs in hue of a chrominance signal being outputted (see FIG. 8).

In order to solve such hue deviation, a sampling frequency of the signal may be increased; however, it is not favorable that the sampling frequency is increased in a digital circuit because that causes increase of consumption electric power.

SUMMARY OF THE INVENTION

Therefore, a principal object of the present invention is to provide a digital video camera capable of efficiently implementing suppression of low-saturation chrominance in a digital signal processing.

A digital video camera according to the present invention comprises saturation calculating means for calculating a saturation on the basis of two color difference signals; suppression coefficient calculating means for calculating a suppression coefficient on the basis of the saturation; and multiplying means for multiplying each of the two color difference signals the same suppression coefficient.

The suppression coefficient corresponding to the saturation of the two color difference signals is calculated and the two color difference signals are multiplied by the same suppression coefficient. By doing this method, it becomes possible to suppress hue deviation of the chrominance signal.

On the assumption that the two color difference signals are R-Y and B-Y, in general, the saturation can be represented by the following formula (1).

$$\{(R-Y)^2+(B-Y)^2\}^{\frac{1}{2}} \quad (1)$$

In order to calculate the saturation in accordance with the formula (1), an arithmetic operation of a square root is required, but it is not easy to implement such square root calculation in a digital circuit. In addition, because a multiplying circuit for calculating a square is also required, a circuitry scale becomes large.

Then, in an embodiment according to the present invention, without utilizing a square root calculation and a multiplication for square, a value corresponding to an actual saturation, that is, a pseudo-saturation is calculated.

In the following, a method for calculating the pseudo-saturation will be described with referring FIG. 5. At first, the pseudo-saturation is represented by the following formula (2).

$$MAX(|R-Y|, |B-Y|) \quad (2)$$

In addition, MAX (A, B) indicates a larger value out of A and B. If the pseudo-saturation can be represented by the formula (2), pseudo-saturations at points on a dotted line in FIG. 5 become equal to each other. However, the actual saturation is a distance from an origin, and the distance becomes r at points A and C, respectively, and the distance becomes $\sqrt{2}r$ at a point B. That is, as a point is moved on the dotted line from the point B to the point A or from the point B to the point C, the actual saturation becomes small. A distance between a point on the dotted line and the point B is in proportion to $|(|R-Y|-|B-Y|)|$, and therefore, by representing the pseudo-saturation according to the following formula (3), an approximate value of the actual saturation can be calculated.

$$MAX(|R-Y|,|B-Y|)-k|(|R-Y|-|B-Y|)| \quad (3)$$

where, k is a constant. In the formula (3), if the pseudo-saturations at the points B and C are calculated, the same becomes r and r-kr, respectively. Since the actual saturations at that points are $\sqrt{2}r$ and r, respectively, the following formula (4) can be obtained.

$$r:(r-rk)=\sqrt{2}r:r \quad k=0.29 \quad (4)$$

However, in the embodiment according to the present invention, for simplifying structure of the digital circuitry, it is set that k=0.25. Lines each representing the same saturation of the pseudo-saturations according to the above described method are shown in FIG. 7.

After calculating the pseudo-saturation, the suppression coefficient according to a level of the pseudo-saturation is calculated. A line representative of a relationship between the pseudo-saturation and the suppression coefficient is constituted by a plurality of polygonal lines as shown in FIG. 6, and therefore, by setting a parameter, it is possible to implement a plurality of a characteristics. By multiplying the suppression coefficient calculated by this method is with each of the two color difference signals, a signal in which a chrominance signal of a low-saturation portion is suppressed can be outputted.

According to the present invention, by calculating the suppression coefficient according to the pseudo-saturations of the two inputted color difference signals and by multiplying the two color difference signals by the same suppression coefficient, the hue deviation of the chrominance signal can be solved, and therefore, it is unnecessary to make the sampling frequency large, and accordingly, it is possible to reduce the consumption electric power for the digital circuitry.

In addition, in the embodiment, the means for calculating the pseudo-saturation on the basis of the two color difference signals is constituted with simple circuits such as absolute value circuits, a subtracting circuit, a selecting circuit and bit-shift circuits so that the saturation is calculated as a pseudo value, and therefore, the square root calculation and the square calculation that invite increase of a circuitry scale of the digital circuit are not needed. Then, a line representative of a relationship of the pseudo-saturation to the suppression coefficient, which is utilized for calculating the suppression coefficient on the basis of the pseudo-saturation, is constituted by a plurality of polygonal lines, and therefore, it is possible to change a suppression characteristic by changing the parameter.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing an embodiment according to the present invention;

FIG. 2 is a timing chart showing a clock and an enable signal in FIG. 1 embodiment;

FIG. 3 is a block diagram showing a pseudo-saturation calculating circuit in FIG. 1 embodiment;

DETAILED DESCRIPTION OF THE PREFERRED EMBODIMENTS

Figure 4:
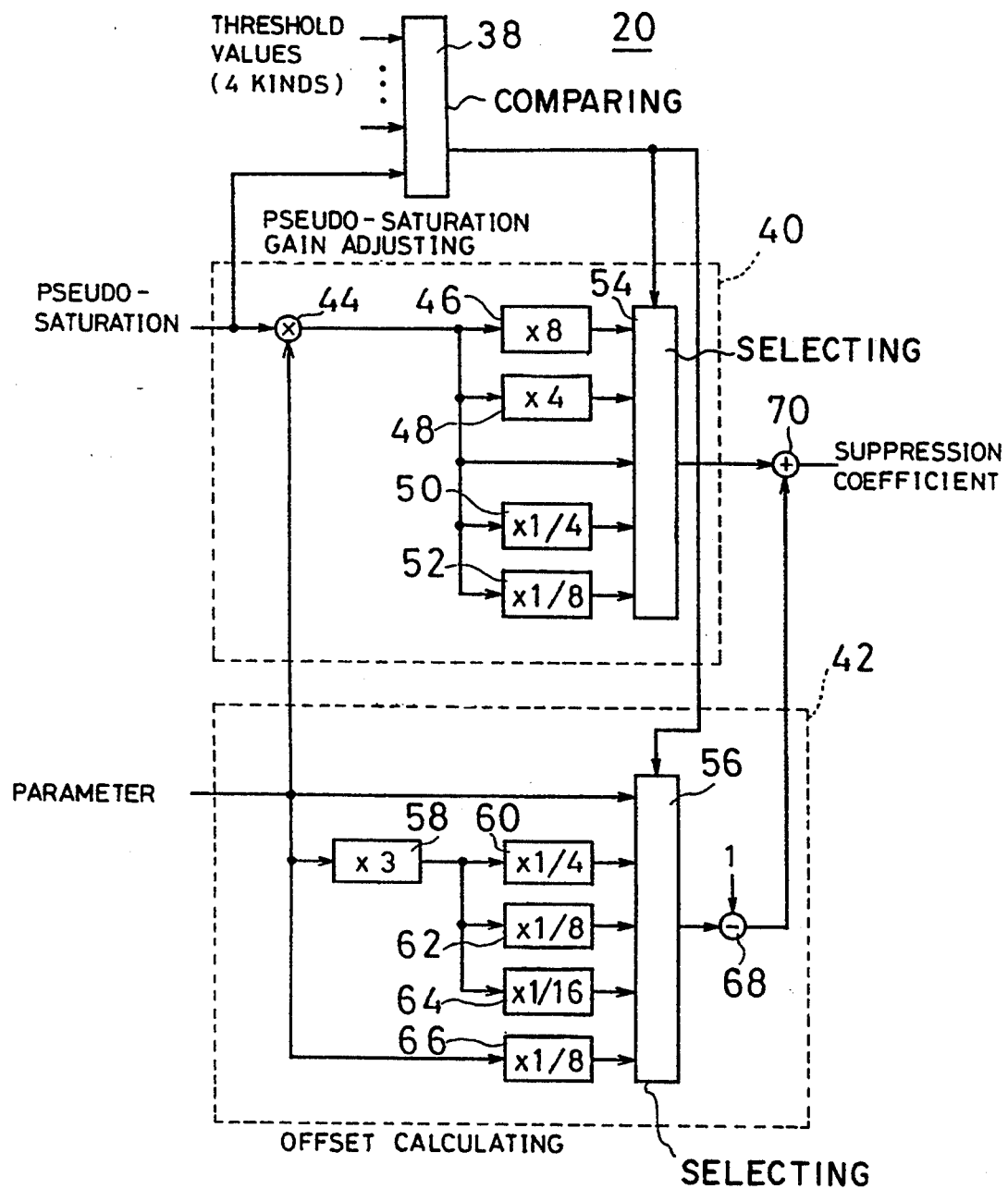
FIG. 4 is a block diagram showing a suppression coefficient calculating circuit in FIG. 1.
Figure 5:
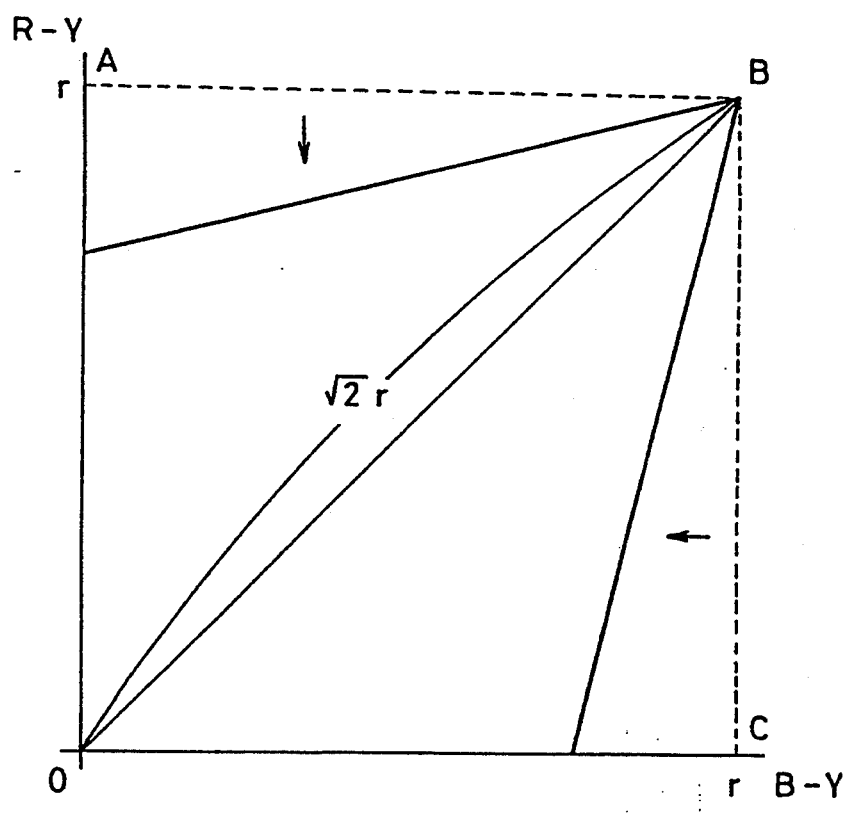
FIG. 5 is an illustrative view showing the pseudo-saturation to be calculated by FIG. 3 circuit.

A low-saturation chrominance suppression circuit 10 of an embodiment shown in FIG. 1 includes latch circuits 12 and 14 for respectively latching inputted two color difference signals R-Y and B-Y, and the color difference signals are respectively latched by the latch circuits 12 and 14 in a period that an enable signal shown in FIG. 2 is the high level. Therefore, each of the two color difference signals latched by the latch circuits 12 and 14 becomes a signal of 2-clock period of a clock shown in FIG. 2, and the same is inputted to a selecting circuit 16 and a pseudo-saturation calculating circuit 18. A pseudo-saturation outputted from the pseudo-saturation calculating circuit 18 is inputted to a suppression coefficient calculating circuit 20 together with a parameter which is inputted by a control circuit (not shown), and a suppression coefficient responsive to a level of the inputted pseudo-saturation is calculated. At the time, the suppression coefficient also becomes a 2-clock period signal.

On the other hand, the latched two color difference signals are also inputted to the above described selecting circuit 16, and each of the color difference signals is outputted in a dot sequential manner in response to the enable signals used for the latch circuits 12 and 14. The color difference signals each outputted in a dot sequential manner is multiplied by the suppression coefficient of the 2-clock period signal in a multiplying circuit, and therefore, the same suppression coefficient is multiplied with each of the two color different signals. Resultingly, a chrominance signal in which a low-saturation portion is suppressed is outputted from the multiplying circuit 22.

In the pseudo-saturation calculating circuit 18 shown in FIG. 3, the inputted color difference signals R-Y and B-Y are made as signals of absolute values, respectively, by absolute value circuits 24 and 26. The absolute value signals are inputted to a subtracting circuit 28 and a selecting circuit 30. An output of the subtracting circuit 28 is also made as an absolute value by an absolute value circuit 32 and a quarter of the output, that is, $\frac{1}{4}$ times the output is outputted by a bit-shift circuit 34. A carry signal that is an output of the subtracting circuit 28 is functions as a control signal for the selecting circuit 30, and the selecting circuit 30 selects and outputs an input signal which is larger than another input signal when the carry signal is the high level. An output signal from the bit-shift circuit 30 is subtracted from an output of the selecting circuit 30 by a subtracting circuit 36, and therefore, a pseudo-saturation is outputted from the subtracting circuit 36.

Figure 6:
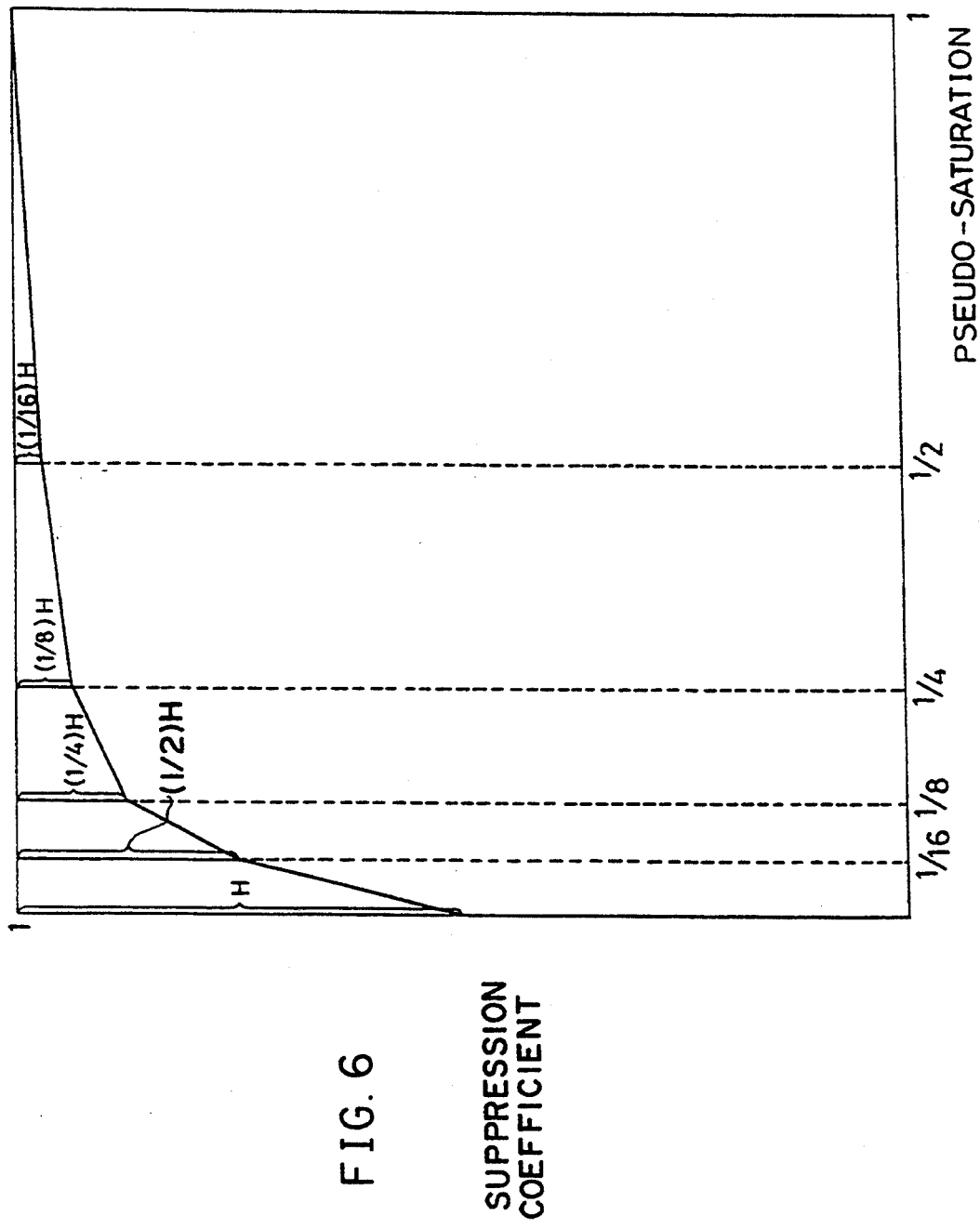
FIG. 6 is a graph showing a relationship between the suppression coefficient to be calculated by FIG. 4 circuit and the pseudo-saturation.
Figure 7:
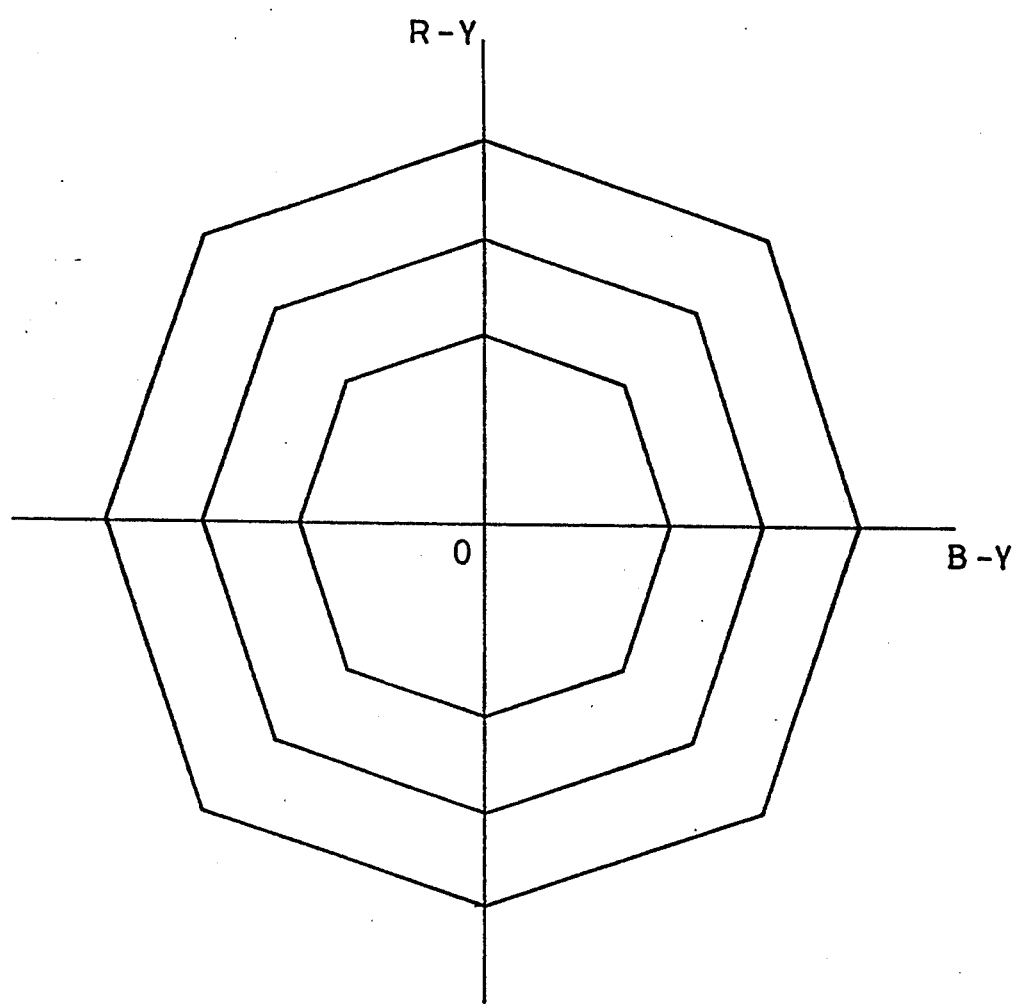
FIG. 7 is a graph showing lines each representative of the same saturation.
Figure 8:
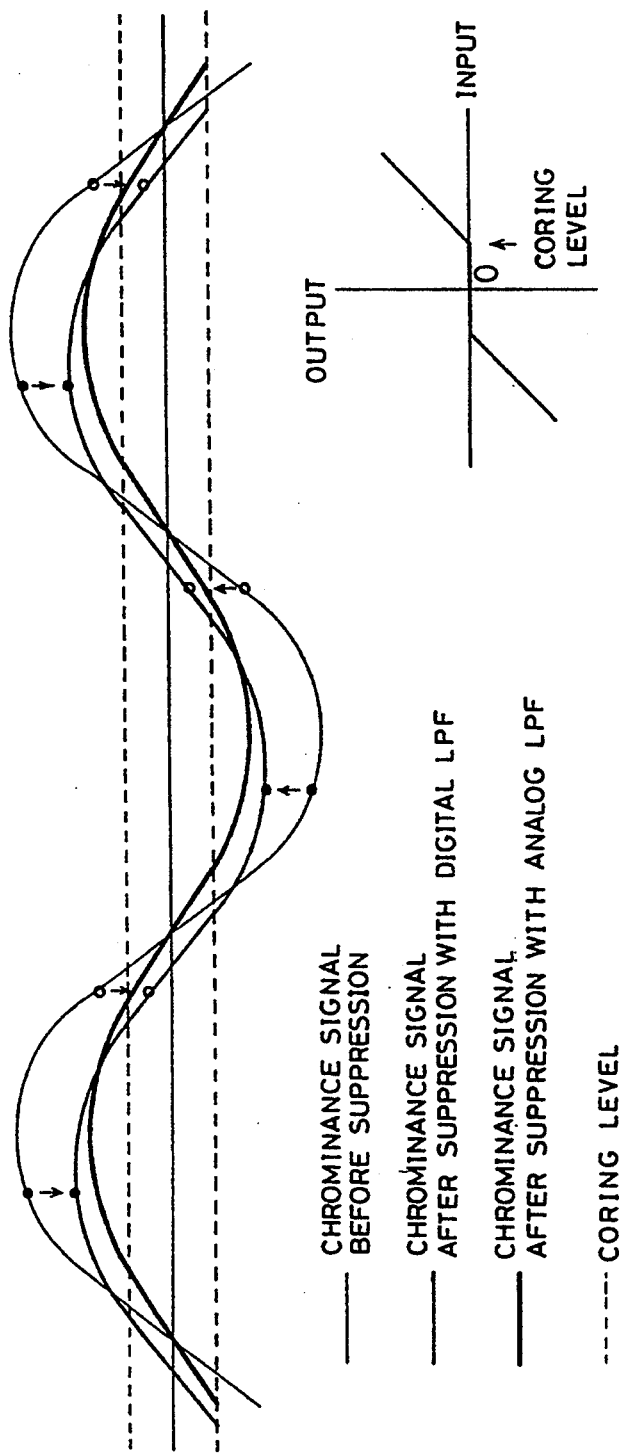
FIG. 8 is a wave-form chart showing hue deviation in the conventional analog signal processing.

Next, a method for calculating a suppression coefficient corresponding to a value of the pseudo-saturation thus calculated will be described. A line representative of a relationship between the pseudo-saturation and the suppression coefficient is composed of a plurality of (5 in this embodiment shown) polygonal lines as shown in FIG. 6. In addition, in FIG. 6, the pseudo-saturation and the suppression coefficient are respectively normalized with "1". A difference of a value of the suppression coefficient at a time that the pseudo-saturation is "0" and the suppression coefficient of "1" becomes a parameter H. Differences between values of the suppression coefficients at times that the pseudo-saturations are respectively "1/16", "$\frac{1}{8}$", "$\frac{1}{4}$" and "$\frac{1}{2}$" and the suppression coefficient of "1" becomes ($\frac{1}{2}$)H, ($\frac{1}{4}$)H, ($\frac{1}{8}$)H and (1/16)H. Therefore, gains and offsets of respective polygonal lines becomes as shown in the following table 1.

TABLE 1

| Section | Gain | Offset |
| --- | --- | --- |
| 0–1/16 | 8H | 1–H |
| 1/16–1/8 | 4H | 1–(3/4)H |
| 1/8–1/4 | H | 1–(3/8)H |
| 1/4–1/2 | (1/2)H | 1–(3/16)H |
| 1/2–1 | (1/4)H | 1–(1/8)H |

FIG. 4 is the suppression coefficient calculating circuit 20. The pseudo-saturation is compared with 4 kinds of threshold value by a comparator 38. More specifically, the comparator 38 determines that an inputted pseudo-saturation is fallen into what section, and outputs control signals to a pseudo-saturation gain adjusting circuit 40, and two selecting circuits 54 and 56 of an offset calculating circuit 42. Furthermore, the pseudo-saturation is multiplied by the parameter H by a multiplying circuit 44 included in the gain adjusting circuit 40, and in turn, subjected to a gain-adjustment by bit-shift operations by bit-shift circuits 46, 48, 50 and 52. Therefore, a result obtained by multiplication of a gain of each polygonal line and the pseudo-saturation is inputted in the above described selecting circuit 54.

In order to calculate an offset, basically, 5 subtracting circuits are needed. However, in this embodiment shown, values to be subtracted are calculated in advance by an adding circuit 58 and bit-shift circuits 60–66, and one of the values is selected by a selecting circuit 56 so as to be subtracted from "1" by a subtracting circuit 68, whereby only one subtracting circuit is needed. Therefore, to the selecting circuit 56, 5 kinds of values from which the respective offsets can be calculated are inputted. A signal selected by the selecting circuit 56 in response to the control signal outputted from the comparator 38 is subtracted from "1" by a subtracting circuit 68 so as to become an offset. The offset is added to a signal from the selecting circuit 54 by an adding circuit 70 so as to become a suppression coefficient.

The suppression coefficient thus calculated is applied to the multiplying circuit 22 shown in FIG. 1, and in multiplying circuit 22, each of the color difference signals R-Y and B-Y which are outputted from the selecting circuit 14 in a dot sequential manner is multiplied by the suppression coefficient so that a low-saturation chrominance signal can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital video camera, comprising:
   saturation calculating means for calculating a saturation on the basis of two color difference signals;
   suppression coefficient calculating means for calculating a suppression coefficient according to said saturation; and
   multiplying means for multiplying each of said two color difference signals by the same suppression coefficient;
wherein said saturation calculating means includes a pseudo-saturation calculating circuit for calculating a pseudo-saturation equal to an actual saturation, said pseudo-saturation calculating circuit including two first absolute value circuits for respectively calculating absolute values of said two color difference signals, a first subtracting circuit for calculating a difference of two absolute values, a selecting circuit for selecting one of said two absolute values, a second absolute value circuit for calculating an absolute value of said difference, a multiplying circuit for multiplying an output signal from said second absolute value circuit by a gain, and a second subtracting circuit for subtracting an output signal of said multiplying circuit from an output signal of said selecting circuit.

2. A digital video camera according to claim 1, wherein said suppression coefficient calculating means includes a comparing circuit for comparing a pseudo-saturation signal outputted from said pseudo-saturation calculating circuit with a plurality of threshold values, a saturation gain adjusting circuit for receiving an output signal of said comparing circuit, said pseudo-saturation signal and a parameter, an offset calculating circuit for receiving the output signal of said comparing circuit and said parameter, and an adding circuit for adding an output signal of said saturation gain adjusting circuit and an output signal of said offset calculating circuit.

3. A digital video camera according to claim 2, wherein said saturation gain adjusting circuit includes a multiplying circuit for multiplying said pseudo-saturation signal by said parameter, a plurality of bit-shift circuits for gain-adjusting a result of a multiplication, and a selecting circuit for receiving outputs of said plurality of bit-shift circuits.

4. A digital video camera according to claim 2, wherein said offset calculating circuit includes an adding circuit for gain-adjusting said parameter, a plurality of bit-shift circuits for receiving a result of an addition, a selecting circuit for receiving output of said plurality of bit-shift circuits and said parameter, and a subtracting circuit for subtracting an output of said selecting circuit from a constant.

5. A digital video camera according to claim 3, wherein said offset calculating circuit includes an adding circuit for gain-adjusting said parameter, a plurality of bit-shift circuits for receiving a result of an addition, a selecting circuit for receiving output of said plurality of bit-shift circuits and said parameter, and a subtracting circuit for subtracting an output of said selecting circuit from a constant.

* * * * *